INVENTORS
GEORGE G. KLIEWER
JOHN H. ROBERTS

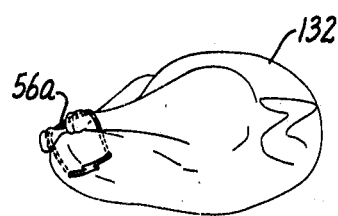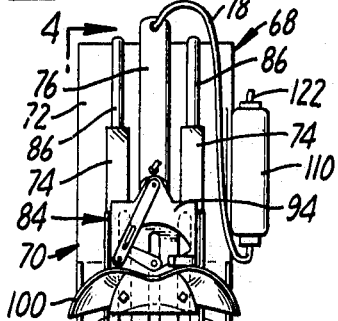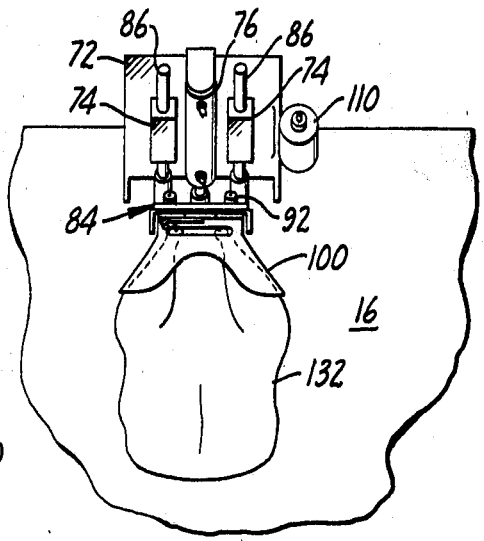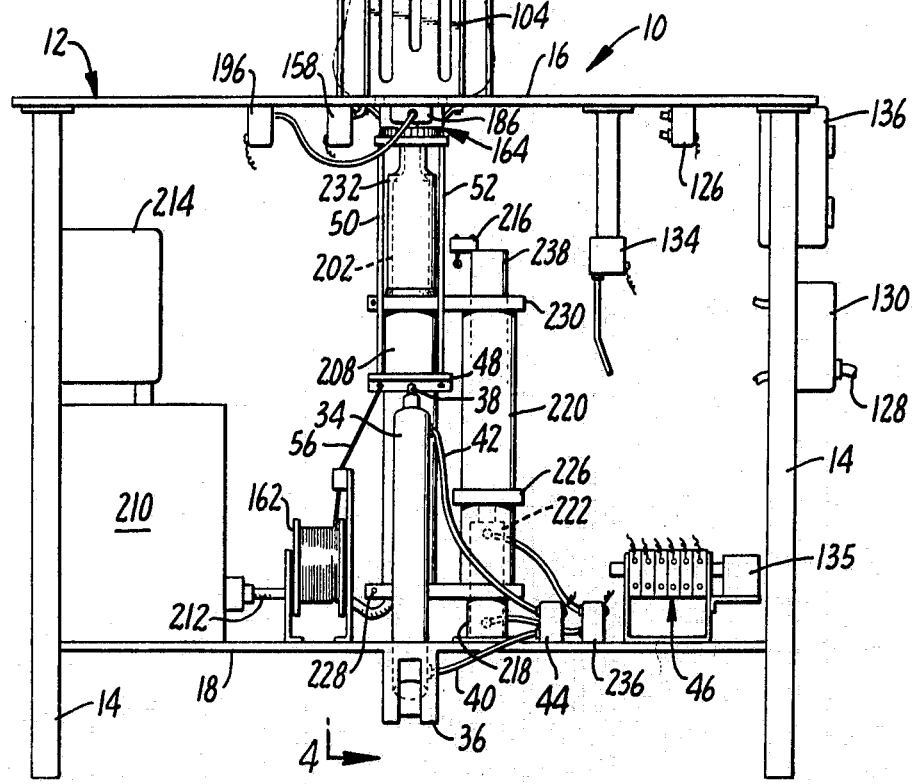
May 5, 1970    G. G. KLIEWER ET AL    3,509,594
METHOD FOR TYING CARCASSES
Original Filed Feb. 21, 1967    6 Sheets-Sheet 1
FIG. 1.
FIG. 3.
FIG. 2.
INVENTORS
GEORGE G. KLIEWER
JOHN H. ROBERTS
Naylor & Neal
ATTORNEYS

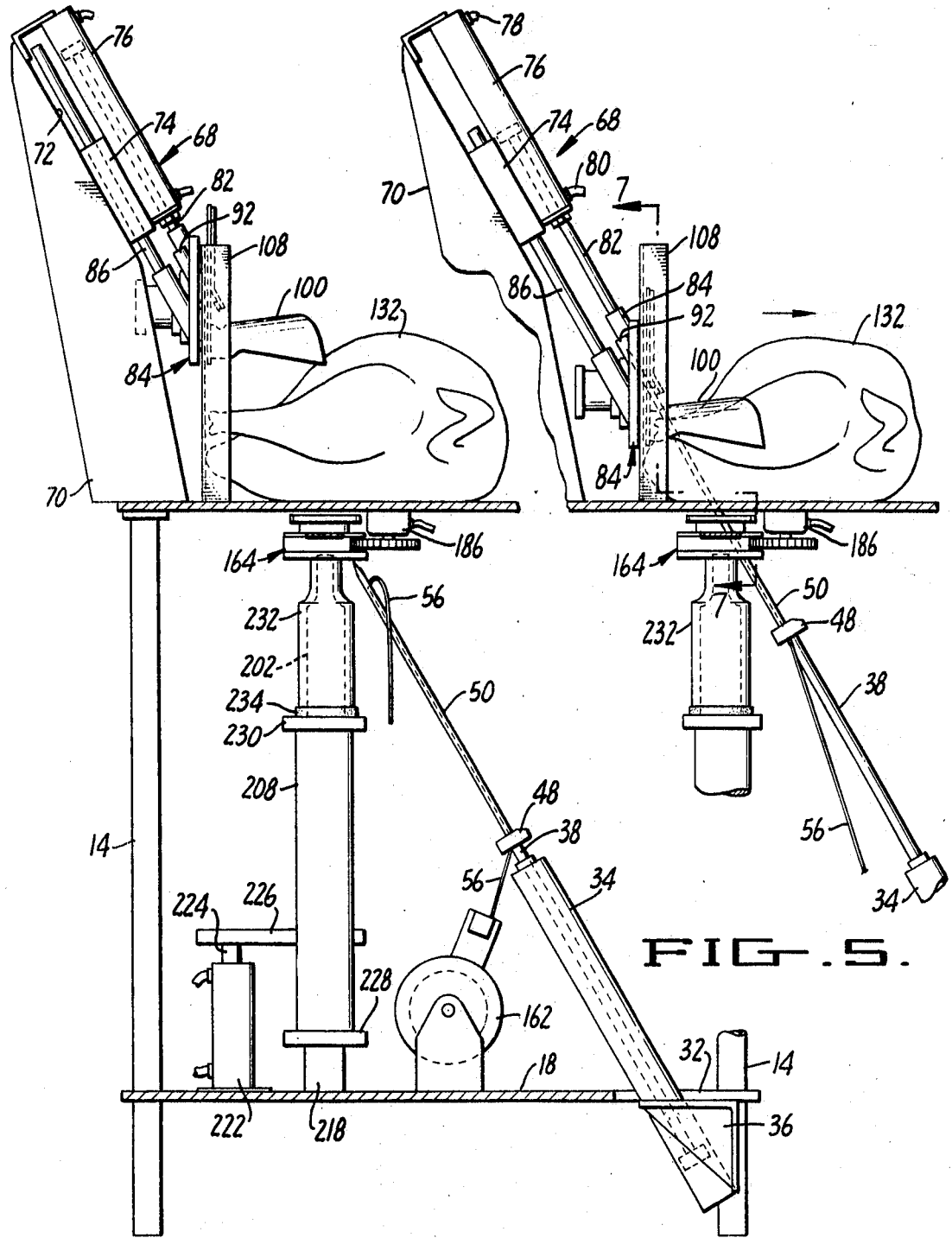

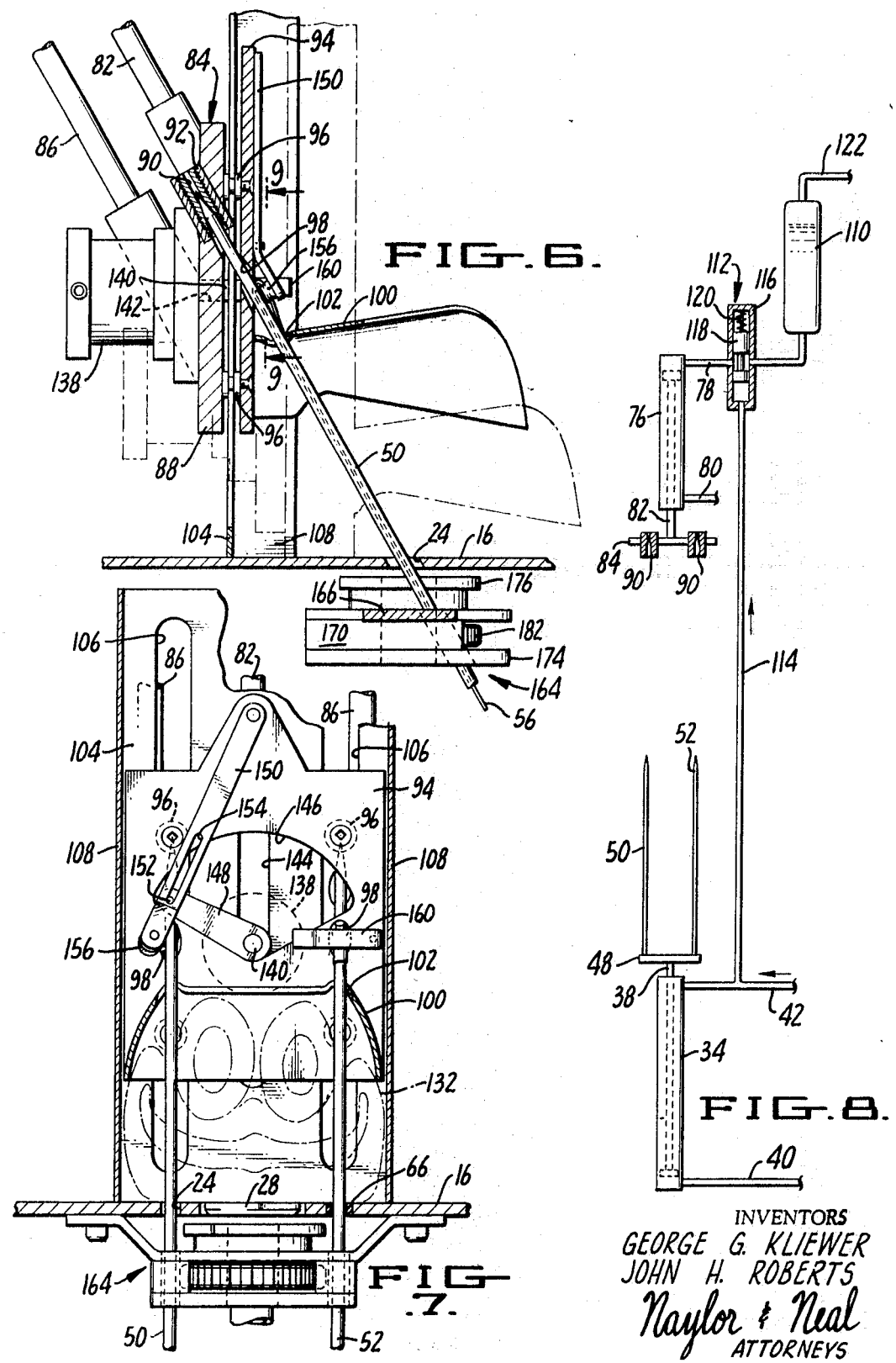

*Naylor & Neal*
ATTORNEYS

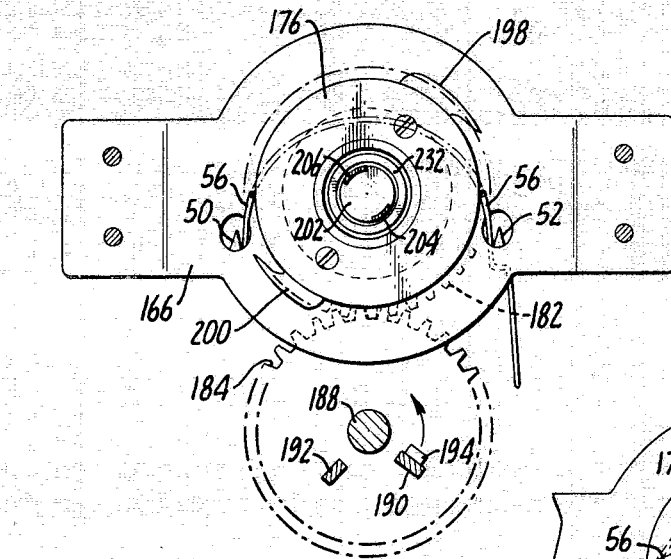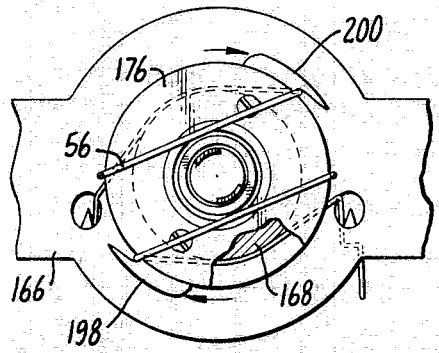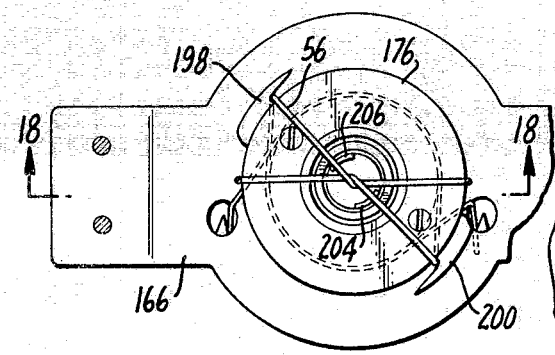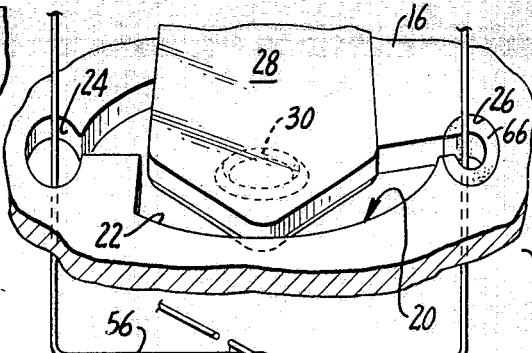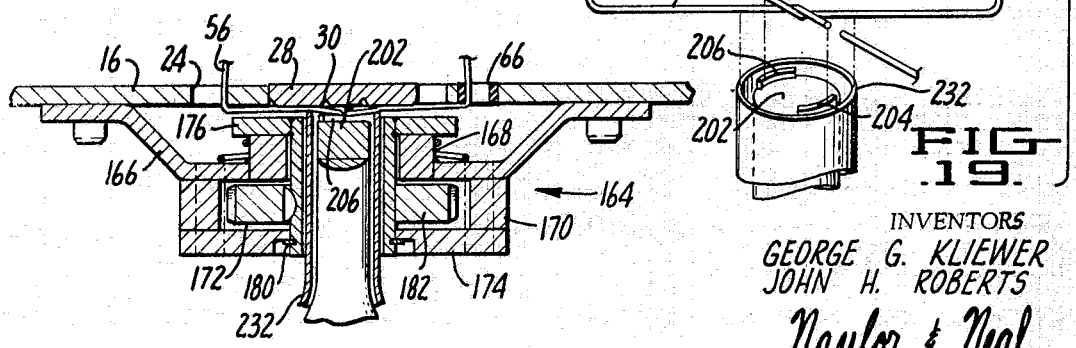

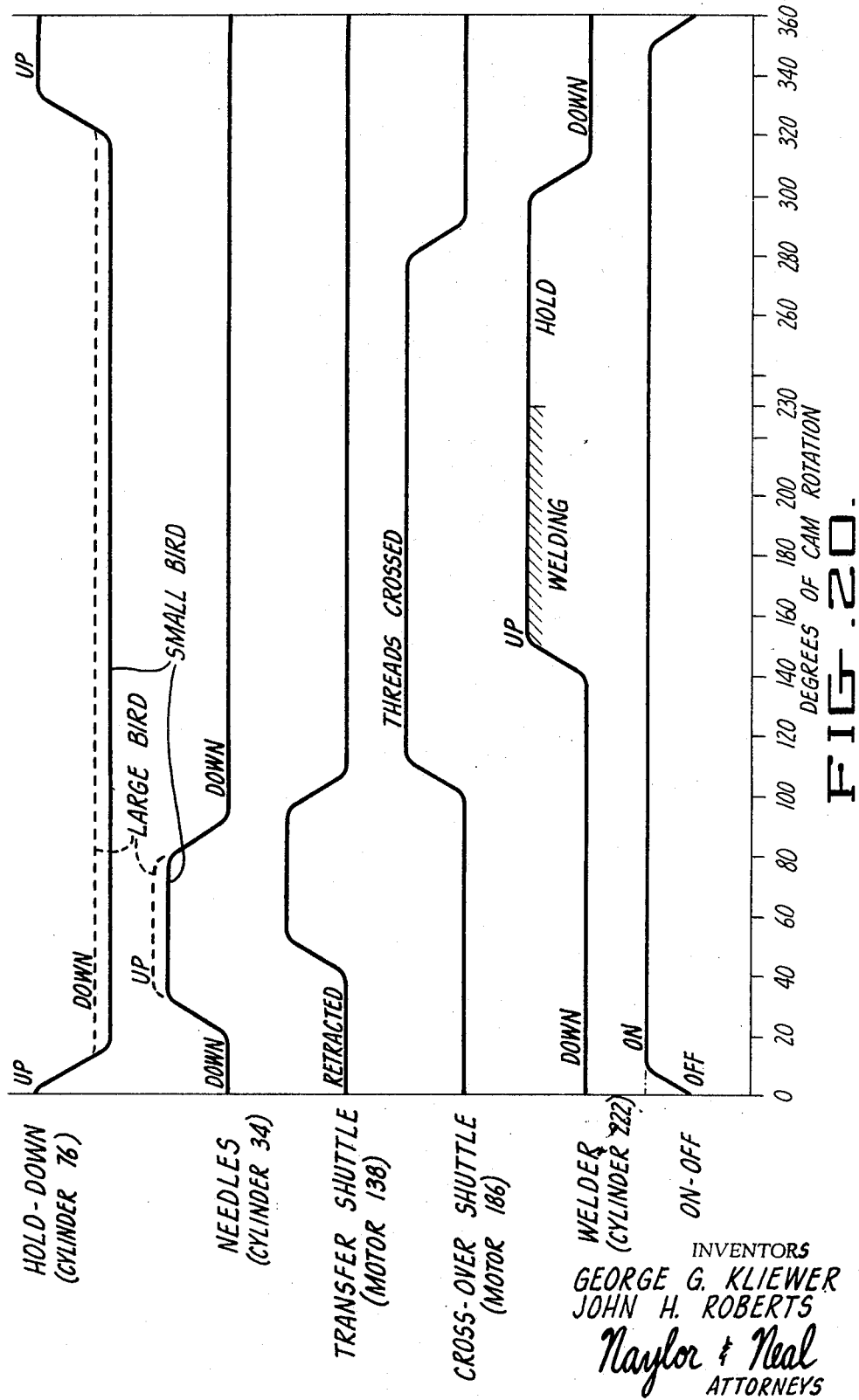

United States Patent Office 3,509,594
Patented May 5, 1970

3,509,594
METHOD FOR TYING CARCASSES
George G. Kliewer and John H. Roberts, Fresno, Calif., assignors to Dun-Rite Manufacturing Corporation, Fresno, Calif., a corporation of California
Original application Feb. 21, 1967, Ser. No. 617,643, now Patent No. 3,474,489, dated Oct. 28, 1969. Divided and this application May 19, 1969, Ser. No. 825,713
Int. Cl. A22c 21/00
U.S. Cl. 17—45                     7 Claims

ABSTRACT OF THE DISCLOSURE

A method for tying the legs of eviscerated animals, and particularly birds, to the bodies thereof with an axially continuous thread. In the method the legs of the animal are forced against its body and then an axially continuous thread is directed around the legs and body to form a loop which performs the tying function. To form the loop, spaced portions of the thread are secured together.

---

This application is a division of our copending application Ser. No. 617,643, filed Feb. 21, 1967, now Patent No. 3,474,489, issued Oct. 28, 1969.

The present invention relates to the art of tying eviscerated animals, and particularly poultry. The invention is especially concerned with a method ideally suited for the handling of large volumes of birds in the commercial processing of poultry. It is also concerned with the provision of a tie which may be left in place when a bird is distributed to the ultimate consumer and, if desired, employed by the ultimate consumer when the bird is prepared for consumption by roasting or other cooking processes.

In the prior art, various techniques have been employed for securing the legs of eviscerated birds to the bodies thereof for packaging and/or cooking purposes. One of the most typical of these techniques simply comprises forcing the distal ends of the bird legs beneath a "bar cut" of skin at the rearmost portion of the bird body. To facilitate this technique, during evisceration of the bird the "bar cut" is deliberately preserved. This preservation inherently renders cleaning of the bird difficult and, for this reason, it is subject to close scrutinization by the food and drug authorities. Employment of the "bar cut" for leg retention purposes also frequently presents problems in manipulating the legs into retained position.

Prior art techniques have also employed various mechanical contrivances to effect retention of poultry legs. Certain of these employ leg engaging spring retention elements having portions designed for gripping engagement with the bone structure of the bird. Others employ wire segments designed for the formation of a loop around the body and legs of the birds. Both of these, however, have the disadvantage that the wire employed therein is difficult to remove and presents a safety hazard. Prior art techniques have also employed cords or threads to secure the legs of poultry in place. These techniques, however, have required considerable hand manipulation and, thus, have not been suited for the large volume commercial processing of poultry. Such techniques have typically been employed by housewives in preparing poultry for roasting.

The method of the present invention may be summarized as comprising two steps. The first of these steps comprises disposing the bird against a support and forcing its legs against its body. The second step comprises the sequential operation of:

(1) Passing a thread through the body of the bird laterally of one of its legs so that the leading end of the thread is to one side of the bird and the trailing end is to the other side of the bird;

(2) Shuttling the leading end of the thread across the bird to a position laterally of the other of the legs thereof;

(3) Passing the leading end of the thread through the body of the bird laterally of the other leg so that the leading and trailing ends of the thread are both on the other side of the bird;

(4) Securing the leading and trailing end of the thread together under tension to define a loop extending around the body and legs of the bird.

A principal object of the present invention is to provide a method capable of avoiding the problems associated with the prior art, as typified in the foregoing discussion.

Another and more specific object of the invention is to provide a method suitable for the commercial processing of poultry which employs a continuous thread for leg retention purposes.

The details of the invention and the foregoing and other objects will become more apparent when viewed in light of the accompanying drawings wherein:

FIG. 1 is a perspective view exemplifying a bird tied with a continuous thread applied by the method of the invention;

FIG. 2 is an elevational view, with parts thereof broken away for the sake of simplicity, illustrating the preferred machine employed for the practice of the method in condition to receive a bird to be tied;

FIG. 3 is a partial plan view of the machine illustrated in FIG. 2;

FIG. 4 is a sectional elevational view taken on the plane designated by line 4—4 in FIG. 2;

FIG. 5 is an elevational sectional view, corresponding to FIG. 4, but with the thread directing needles and leg or hock depressing element in the extended condition;

FIG. 6 is a partial sectional elevational view illustrating the thread directing needles and leg or hock depressing element in the extended condition, similarly to FIG. 5, and also showing by a solid and phantom line comparison, the path of movement of the hock depressing element;

FIG. 7 is a sectional view taken on the plane designated by line 7—7 in FIG. 5;

FIG. 8 is a schematic view diagrammatically illustrating the control circuit for the thread directing needles and the leg or hock depressing element;

Figure 9:
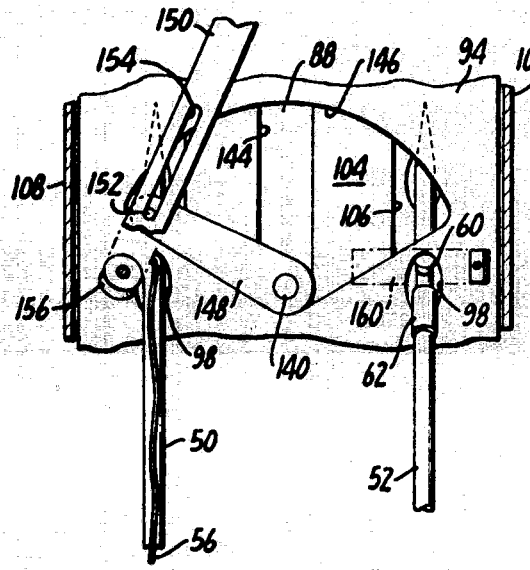
FIG. 9 is a sectional view taken on the plane designated by the line 9—9 in FIG. 6.
Figure 11:
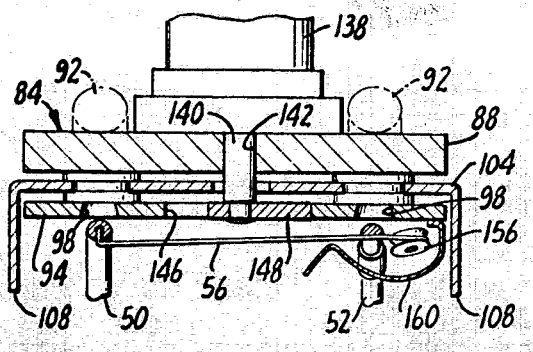
FIG. 11 is a sectional view taken on the plane designated by the line 11—11 in FIG. 10.

FIG. 15 is a partial plan sectional view illustrating the cross-over shuttle designed to effect crossing and tensioning of a loop formed by the machine in the condition it assumes immediately upon retraction of the thread directing needles from the extended condition illustrated in FIG. 5, with phantom lines graphically illustrating the path the thread would assume when first looped around the bird;

FIGS. 16 and 17 are partial plan sectional views, corresponding to FIG. 15, but showing the cross-over shuttle in the intermediate and final positions, respectively, it assumes when effecting cross-over and tensioning;

FIG. 18 is a sectional elevational view taken on the plane designated by line 18—18 in FIG. 17 and illustrating the structure immediately above the cross-over shuttle;

FIG. 19 is a partial perspective view diagrammatically illustrating the interrelationship of the thread welding device which effects securing of a thread loop after it has assumed the condition illustrated in FIG. 17; and FIG. 20 is a time and motion chart diagrammatically illustrating the motions of the various components of the machine in relation to the degree of rotation of the cam shaft governing their operation.

Referring now to the drawings, the machine therein is designated in its entirety by the numeral 10. As a basic component, the machine comprises a table 12 consisting of legs 14 interconnected by an upper working support surface 16 and the lower equipment support surface 18. The surfaces 16 and 18, preferably, are fabricated of metal plate and rigidly connected to each of the legs 14. The surface 16 is closed, with the exception of a centrally disposed opening 20 (see FIG. 19). The opening 20 comprises an elongated central portion 22 having appendage portions 24 and 26 communicating therewith. An anvil plate 28 is fixedly mounted in the portion 22 in substantially coplanar relationship with the plate 16. The anvil plate, as can be seen from FIG. 19, has a centrally disposed annular groove 30 formed in the lower surface hereof. The appendage portions 26 of the opening 20 are designed, as will become more apparent subsequently, to slidably receive the thread directing needles of the machine.

The equipment supporting surface 18 may be provided with any number of suitable openings to facilitate the mounting of machine components thereto. This surface also includes an opening 32 at one end thereof for extension of a pneumatic power cylinder 34 therethrough. The cylinder 34 is of the double acting type and is mounted on the surface 18 by a bracket 36. As thus mounted, the cylinder 34 is disposed at approximately a 60° angle with respect to the surfaces 16 and 18.

The cylinder 34 is of conventional double acting character and includes a piston rod 38 mounted for reciprocation therein. Selective reciprocation of the rod 38 is effected by selectively applying air to opposite ends of the cylinder 34 through conduits 40 and 42 connected in fluid communication with the interior of the cylinder. Selective operation through the conduits 40 and 42 is effected by an electrically operated valve 44 interposed in fluid communication between the conduits and a conduit (not illustrated) leading to a primary source of air. Selective activation of the valve 44 is controlled in timed sequence by one of a series of cam operated switches 46. The operation of the switches 46 will be developed in detail subsequently.

A cross head 48 is fixedly mounted on the distal end of the rod 38 for reciprocation therewith. The head 48, in turn, has fixedly supported thereon in parallel relationship with the rod 38 a pair of thread directing needles 50 and 52. The needles 50 and 52 are disposed, respectively, in axial alignment with the portions 24 and 26, respectively, for slidable movement therethrough. Thus, upon retraction and extension of the piston rod 38, the needles 50 and 52 are facilitated to move between the retracted and extended conditions, respectively, illustrated in FIGS. 4 and 5.

Figure 12:
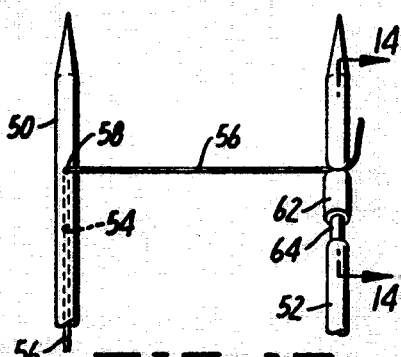
FIG. 12 is a partial elevational view illustrating the thread directing needles in the condition they assume upon being retracted from the position shown in FIG. 10.
Figure 13:
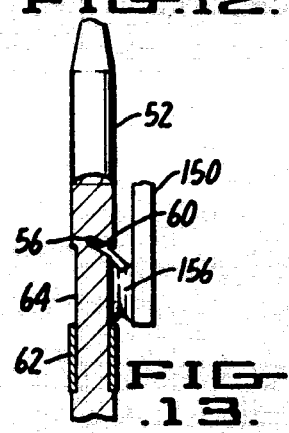
FIG. 13 is a sectional view taken on the plane designated by the line 13—13 in FIG. 10.
Figure 14:
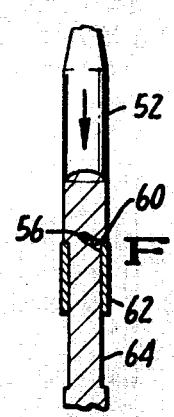
FIG. 14 is a sectional view taken on the plane designated by line 14—14 in FIG. 12.

The construction of the needles 50 and 52 may be seen from FIGS. 12, 13 and 14. As there shown, the needle 50 has an axial passage 54 extending therethrough through which an axially continuous thread 56 may be extended. The passage 54 is axially open at its lower extremity for receipt of the thread 56 through the cross head 48 (see FIG. 2). A lateral opening 58 formed in the upper end of the needle 50 provides for withdrawal of thread from the passage 54.

In operation of the machine, as will be developed in detail subsequently, upon extension of the needles 50 and 52 to the condition illustrated in FIG. 5, the leading portion of the thread 56 is directed from the needle 50 into engagement with the needle 52. Engagement and retention of the leading portion of the thread thus directed to the needle 52 is provided by a slot 60 formed in the needle and a sleeve 62 slidably received on the needle. The sleeve 62 is slidably received on a necked-down portion 64 of the needle 52 for movement between positions exposing and closing the slot 60, as shown in FIGS. 13 and 14, respectively. Movement of the sleeve 62 between the slot opening and closing positions is provided by the resistive force imparted to the sleeve as the needle 52 is retracted through a bird, as illustrated by the arrow line in FIG. 14. Return of the sleeve 62 to the retracted slot exposing position illustrated in FIG. 13 is provided by resistive and gravitational forces imparted to the sleeve as the needle 52 is extended to the extended condition illustrated in FIG. 5 from the retracted position shown in FIG. 4. During the latter movement, resistive force is imparted to the sleeve 62 by a resilient grommet 66 mounted in the portion 26 of the opening 20 for dragging engagement with the sleeve.

The support surface 16 has mounted thereon a mechanism, designated in its entirety by the numeral 68, designed for operative cooperation with the needles 50 and 52. The mechanism 68 comprises, as a fixed component, a rigid pedestal 70 fixedly secured to a rearmost portion of the surface 16. The pedestal 70 has formed thereon an inclined mounting surface 72 disposed in spaced parallel relationship with the plane defined by the needles 50 and 52. The surface 72 fixedly supports a pair of tubular guides 74 and the double acting hydraulic cylinder 76. The cylinder 76 is of relatively conventional form and includes fluid conduits 78 and 80, respectively, communicating with the opposite ends thereof and a power transmitting piston rod 82 mounted for selective extension and retraction. The piston rod 82 is secured to a carriage 84 which, in turn, is mounted by guide rods 86 fixed thereto and slidably received within the tubular guides 74. Through the latter provision, the carriage 84 is mounted for rectilinear movement in a path parallel to the path of the needles 50 and 52.

The carriage 84 comprises, as can be seen from FIGS. 6 and 7, the following basic elements: a vertically disposed primary support plate 88 secured directly to the piston rod 82 and the guide rods 86; needle receiving stops 90 threadably received in sockets 92 fixed to the plate 88 in axial alignment with the needles 50 and 52; a secondary support plate 94 fixedly mounted in spaced parallel relationship with the primary plate 88 by spacer elements 96 secured between the respective plates, said secondary plate having openings 98 therein axially aligned with the needles 50 and 52 to permit their passage into the stops 90; a leg or hock depressing shoe 100 of generally concave lower configuration fixed to and extending laterally from the secondary plate 94, said shoe having an opening 102 formed therein to permit the free passage of the needles 50 and 52 therethrough into engagement with the stops 90; and, a carcass orienting plate 104 slidably received between the plates 88 and 94 for continuous support on the surface 16. The plate 104 has elongated slots 106 extending therethrough for slidable receipt of the spacer elements 96 and is formed with lateral flanges 108 extending to either side of the plate 94.

A control system operatively coupling the cylinders 34 and 76 together is diagrammatically illustrated in FIG. 8. This system comprises, in addition to the aforedescribed This system comprises, in addition to the aforedescribed conduits 40 and 42 and the controlled air supply therefor, the following elements: an oil reservoir 110 connected in fluid communication with the conduit 78; a pneumatically operated shutoff valve 112 interposed in the conduit 78; and, a conduit 114 connected in fluid communication between the conduit 42 and the valve 112 to effect control of the valve responsive to the pressure condition in the conduit 42. The valve 112 comprises a housing 116 having a dumbbell shaped piston 118 slidably received therein and a spring 120 disposed to normally urge the piston 118 to a position sealingly interposed between the ends of the conduit 78. In operation, when the conduit 42 is subjected to pressure to depress the piston rod 38 and retract the needles 50 and 52, the pressure transmitted to the piston 118 through the conduit 114 moves the piston to the position illustrated in FIG. 8, thus permitting oil from the reservoir 110 to be displaced into the cylinder 76 to depress the carriage 84 and the needle engaging stops 90 secured thereto. When pressure is relieved from the conduit 42 and applied to the conduit 40 to raise the needles 50 and 52, however, the spring 120 functions to bias the piston 118 to a position closing the conduit 78. In the latter position the piston 118, in effect, blocks the needle stops 90 against movement since it confines incompressible oil within the cylinder 76. Thus, as will become more apparent subsequently, when the needles 50 and 52 are forced upwardly against the stops 90, the stops are maintained in a fixed condition.

The cylinder 76 is activated to effect extension of the rod 82 by supplying air to the reservoir 110 through a conduit 122. Retraction of the rod 82 is effected by supplying air to the cylinder 76 through the conduit 80. The conduits 122 and 80 are selectively supplied with air to effect activation of the cylinder 76 through means of an electrically controlled valve 126 (see FIG. 2) connected thereto. The valve 126 is similar to the aforedescribed valve 44 and is controlled in timed sequence by one of the battery of cam operated switches 46. Air is supplied to the valve 126 from a primary supply. In the embodiment illustrated, this supply is shown as comprising a conduit 128 connected at one end to a continuous air source (not illustrated) such as an air compressor and at the other end to a vapor trap and manifold 130 mounted on the mahcine. Although not illustrated, it is to be understood that conduits from the vapor trap and manifold 130 establish communication between the main supply conduit 128 and the control valves 44 and 26. It will also be seen that the vapor trap and manifold 130 function, through conduits of conventional nature, to supply air to the other control valves of the machine.

The structure thus far described provides for the preliminary preparation of a carcass for tying by the machine 10. Specifically, this structure is designed to effect orientation and compression of a carcass on the working support surface 16 and direction of a length of the thread 56 through the carcass. In the preferred form of this operation as practiced on the eviscerated carcass of a bird, such as a turkey, the bird is first placed on the surface 16 with its back against the surface and its legs extending towards the orienting plate 104. An eviscerated bird, designated by the numeral 132, is illustrated in this condition in FIG. 3. After the bird is so placed, it is manually forced against the plate 104 at substantially right angles with respect thereto and with sufficient force to push the ends of its legs to a position substantially flush with its tail end and the timed sequence operation of the machine is triggered. A knee switch 134 (see FIG. 2) is provided to trigger this operation. This switch is electrically connected to a drive motor 135 for the cam shaft which operates the bank of cam operated switches 46. Electrical power is supplied to the switches 46 and the other electrically operated components of the machine which will be developed in the subsequent discussion through conventional circuitry leading to a main power supply and switchbox 136.

Upon triggering of the timed sequence with a bird 132 positioned as illustrated in FIG. 3, the cylinder 76 is first activated to extend the rod 82 and the carriage 84 secured thereto towards the bird. As this occurs, the shoe 100 engages and forces the legs of the bird into compressed condition against its body. Simultaneously with this operation, the orienting plate 104 forces the bird away from the pedestal 70, as indicated by the arrow line in FIG. 5, to a predetermined position above the opening 20. The degree to which the bird is thus moved is dependent upon its size, as measured vertically at its tail portion when the bird is resting on the plate 16, since engagement of the shoe 100 with the legs and upper portion of the bird limits the degree to which the orienting plate 104 travels in the direction of the arrow line in FIG. 5. Specifically, when a small bird is encountered by the shoe 100, the travel path of the plate 104 in the direction of the arrow line in FIG. 5 is relatively long, whereas when a large bird is encountered, this path is relatively short.

The latter condition-responsive operation of the orienting plate 104 is effected by supplying air to the conduit 122 at a pressure sufficient to effect extension of the rod 82 with a predetermined limited degree of force. This force is selected so that the shoe 100 will, upon extension of the rod 82, force the legs of a bird being handled securely against its body without effecting adverse compression of the body. Once the legs of a bird are compressed against its body by the shoe 100 and the cylinder 34 is activated to effect extension of the needles 50 and 52 through the body of the bird, movement of the shoe 100 to a position releasing the legs is prevented. This results because pressure in the conduit 42 is released simultaneously with activation of the cylinder 34 to extend the needles 50 and 52. Thus, upon extension of the needles, the piston 118 moves to a position closing the conduit 78 and preventing the escape of incompressible oil from the cylinder 76.

In summary, the extension of the rod 82 functions, through the shoe 100 and plate 104, to: depress the legs of the bird down; force the legs of the bird forwardly; press the hocks of the bird firmly together; press the legs of the bird against its body; and, position the bird relative to the opening 20.

After a bird has been oriented on the surface 16 and the needles 50 and 52 have been extended therethrough, thread is shuttled from the opening 58 of the needle 50 into engagement with the slot 60 of the needle 52. This function is effected by a transfer shuttle mechanism supported on the carriage 84 for movement therewith. The mechanism comprises: a pneumatically driven reversible motor 138; a shaft 140 driven by the motor 138 and extending therefrom rotatably through an aperture 142 in the plate 88, a slot 144 in the plate 104 and an arcuate opening 146 in the plate 94; a crank 148 keyed to the shaft 140 for rotation therewith in the opening 146; an arm 150 pivotally secured at its upper end to the plate 94 for rotation about an axis parallel to and vertically disposed above the shaft 140; a pin 152 carried by the crank 148 and extending therefrom into slidable engagement with a longitudinally extending slot 154 in the arm 150; and, a thread pickup spool 156 secured to the lower end of the arm 150.

Figure 10:
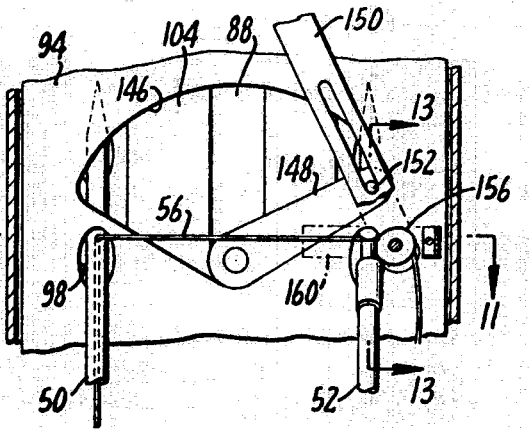
FIG. 10 is a sectional elevational view corresponding to FIG. 9, but showing the thread shuttle after it has operated to carry the thread from one of the thread directing needles to the other.

The end of the arm 150 carrying the spool 156 is bent so that, when the needles 50 and 52 are in the extended condition, the spool is disposed for movement with the arm in a path immediately adjacent the upper surfaces of the needles. This movement, as can be seen from a comparison of FIGS. 9 and 10, is effected by the crank 148 responsive to its rotation by the motor 138. The path thus defined by movement of the spool 156 maintains a fixed orientation with respect to the opening 58 and slot 60 in the extended needles 50 and 52, respectively, regardless of the size of bird being handled. This results because the needles 50 and 52 are always stopped in a predetermined orientation relative to the plate 88 by the stops 90.

Operation of the transfer shuttle mechanism is controlled by selectively supplying air to the motor 138 through an electrically operable valve 158 (see FIG. 2). The valve 158 is supplied with air from a primary air source through the manifold 130 and is provided with conduits (not illustrated) extending to communication with the motor 138. Selective activation of the valve 158 is effected in timed sequence with the balance of the machine 10 by one of the bank of cam operated switches 46.

Upon activation of the motor 138 to effect movement of the spool 156 from the position shown in FIG. 9 to that shown in FIG. 10, the spool picks up the leading end of the thread 56 and directs it into engagement with the slot 60 of the needle 52. This operation is facilitated by a leaf spring 160 mounted on the plate 94 and extending over the opening 98 therein for the needle 52. The spring 160 is deflected by the arm 150 upon its movement to the position shown in FIG. 10 and, upon return of the arm to the position shown in FIG. 9, it functions to push the leading end of the thread against the needle 52 and into the slot 60 therein. During the entire thread directing operation of the machine 10, a continuous supply of thread 56 is supplied from a reel 162 mounted on the surface 18. The reel 162 carries a spool of the thread 56 for free lengthwise removal responsive to the application of tension to the leading end of the thread. Any suitable means may be employed to control the amount of tension required to effect lengthwise withdrawal of thread from the reel.

It is here noted that the needles 50 and 52 are positioned so that when extended they are disposed, respectively, laterally of the legs of a bird being handled. Thus, when the leading end of the thread 56 is directed from the needle 50 to the needle 52 by the transfer shuttle mechanism, it is traversed across both legs of the bird. With the thread so oriented, the machine is in condition for its next stage of operation, namely the lowering of the needles. This is effected by activation of the aforedescribed cylinder 34 through the valve 44.

Upon lowering of the needles 50 and 52, the sleeve 62 slides to a position over the slot 60, as illustrated in FIG. 13, under the influence of resistive force applied thereto as it is pulled through the bird being handled. Thus, the leading end of the thread 56 is retained against lateral displacement from the slot 60. This assures that the leading end of the thread will be retained in the needle 52 as it is lowered. Thus, complete lowering of the needles 50 and 52 to the position illustrated in FIG. 4 effects the formation of a generally U-shaped loop of thread across both legs of the bird being handled and through its body.

After the needles 50 and 52 have been lowered to the position illustrated in FIG. 4 to form a loop of thread around the bird of generally U-shaped configuration, the machine 10 is in position to effect the final tying operation. In this operation, the leading and trailing ends of the thread segment forming the loop are crossed and secured together. The mechanism to effect this operation is supported in the immediate vicinity of the opening 20 and comprises, in part, a cross-over shuttle 164 (see FIGS. 4, 5 and 18) supported on the surface 16 beneath the opening 20. The shuttle 164 comprises: a support bracket 166 bolted to the underside of the surface 16; an annular bearing 168 fixedly supported on the bracket 166 in substantially coaxial alignment with the opening 20; a spacer 170 fixedly secured to and extending around the underside of the bracket 166 to define a chamber 172 therebelow; a lower annular bearing 174 fixed to the spacer 170 in coaxial alignment with the bearing 168 to define a lower wall for the chamber 172; an annular shuttle element 176 rotatably supported on the bearing 168 and having a sleeve 178 coaxially fixed thereto and extending through the bearings 168 and 174; a snap ring 180 received in a groove therefor in the sleeve 178 beneath the bearing 174 to secure the sleeve against axial movement relative to the bearing while permitting rotation of the sleeve in the bearing; a first annular gear 182 keyed to the sleeve 178 for support thereby in the chamber 172; a second annular gear 184 supported beneath the surface 16 in meshing engagement with the gear 182 to effect selective driving thereof, said second gear extending through an opening therefor (not illustrated) in the spacer 170; a reversible pneumatic motor 186 (see FIGS. 4 and 5) secured to the underside of the surface 16 and having a drive shaft 188 coaxially keyed to the second gear 184 to effect driving thereof; a pair of first stops 190 and 192 fixed relative to the surface 16 and extending downwardly therefrom in coaxial relationship relative to the shaft 188; and, a second stop 194 fixed to the gear 184 for abutment, respectively, with the stops 190 and 192 to limit the arc through which the gear 184 can turn. The pneumatic motor 186 for the cross-over mechanism is selectively activated to effect rotation of the shuttle element 176 in opposite directions by the operation of an electrically controlled valve 196. The valve 196 operates, through conduits connected thereto, to selectively supply air from the manifold 130 to the motor 186. The valve 196 is electrically controlled in timed sequence with the other operations of the machine 10 by one of the bank of cam operated switches 46.

When the needles 50 and 52 are first retracted to form a generally U-shaped loop of thread around a bird being handled, the cross-over shuttle assumes the condition illustrated in FIG. 15. In this condition, thread engaging hooks 198 and 200 carried on the periphery of the shuttle element 176 are positioned, as viewed in FIG. 15, in counterclockwise spaced relationship from the leading and trailing ends, respectively, of the loop of thread. The hooks 198 and 200 include leading thread engaging grip portions adapted, upon clockwise rotation of the element 176, to engage the leading and trailing ends of a loop of thread disposed as shown in FIG. 15.

Upon retraction of the needles to the position shown in FIG. 15, the cross-over shuttle 164 is activated, through operation of the motor 186, to turn the shuttle element in a clockwise direction, as viewed in FIGS. 15, 16 and 17. During this operation, the hooks 198 and 200 pull the leading and trailing ends of the loop of thread formed around the turkey to the final crossed position illustrated in FIG. 17. FIG. 16 illustrates the operation of the shuttle element 176 and hooks 198 and 200 thereon intermediate the crossing operation. Engagement of the stop 194 with the stops 190 and 192 limits movement of the shuttle element 176 to the opposite extremities illustrated in FIGS. 15 and 17, respectively.

Once the leading and trailing end portions of a segment of thread extended around the bird are crossed, as illustrated in FIG. 17, these portions are secured together to effect the formation of a closed loop extending around the bird. In the preferred embodiment of the machine illustrated, this securing function is effected simultaneously with cutting of the leading and trailing end portions of the segment. Thus, the closed loop is severed from the axially continuous length of thread stored on the reel 162 and excess thread is removed from the leading end of the loop. As a result, a bird completely processed by the machine 10 assumes the condition exemplified in FIG. 1. In this condition, a closed loop of thread, designated by the numeral 56a, having closely cut ends is secured tightly around the body and legs of the bird. It is here noted that the loop assumes a condition disposed at approximately a 60° angle with respect to the bird, thus drawing the legs forwardly relative to the body. For the sake of illustration, it may be assumed that the bird in FIG. 1 is the same bird designated by the numeral 132 in the figures of the drawings showing the machine in operation during the processing of a bird.

Securing and cutting of the crossed ends of the thread exemplified in FIG. 17 is effected through the employment of an ultrasonic welder incorporated into the machine for selective operation in cooperation with the crossover shuttle 164. The ultrasonic welder comprises, as its basic elements, a welding horn 202 mounted beneath the anvil 28 in axial alignment with the groove 30, raised cutting shoulders 204 and 206 integrally mounted on the horn 202 for mating engagement with the groove 30 upon raising of the horn, as will be developed subsequently; an ultrasonic transducer 208 secured to the lower end of the horn 202; an ultrasonic generator 210 supported on the surface 18 and connected to the transducer 208 by a cable 212; and a timer 214 controllably associated with the generator 210 to effect its activation responsive to the triggering of a limit switch 216 fixedly mounted to the table 12. In operation, each time the limit switch 216 is triggered, the timer activates the generator 210 and thus, the welding horn 202, for a predetermined duration.

The welding horn 202 is supported on the surface 18 for selective movement toward and away from the anvil 28. The structure providing for mounting of the horn comprises: a cylindrical guide pedestal 218 fixedly mounted on the surface 18; a cylindrical guide sleeve 220 telescopically received over the pedestal 218 for slidable movement relative thereto; a double acting pneumatic cylinder 222 mounted on the surface 18 in parallel relationship with the guide sleeve 208, said cylinder having a piston rod 224 extending from the upper end thereof for selective extension and retraction; a first strap 226 rigidly interconnecting the guide sleeve 220 and the rod 224 to impart raising and lowering movement of the rod to the sleeve; and, second and third straps 228 and 230 rigidly interconnecting the guide sleeve 220 with the transducer 208 to impart raising and lowering movement of the guide sleeve to the transducer and the horn 202 supported thereon. Through the foregoing mounting arrangement, extension and retraction of the piston rod 224 effects, respectively, raising and lowering of the horn 202. When raised, the horn assumes a position wherein the crossed ends of a thread thereabove are clamped between its upper surface and the lower surface of the anvil 28. In this position, the leading and trailing ends of the thread are clamped between the cutting shoulders 204 and 206, respectively, and the groove 30. As a result of this interrelationship, activation of the horn 202 when in the extended condition functions both to weld the crossed ends of the thread together and to cut its leading and trailing ends, as diagrammatically illustrated in FIG. 19. Severance of the segment of thread forming the loop around the bird being handled is prevented by the recessed portions between the cutting shoulders 204 and 206. These portions are of sufficient depth to prevent cutting of threads disposed thereabove when the horn 202 is raised and activated.

In order for the aforedescribed welding and cutting to be effected, the thread 56 must, naturally, be formed of a material susceptible to ultrasonic welding techniques.

In practice, a preferred thread has been found to be monofilament nylon line similar to the type typically used for fishing. This type of thread has ideal welding and strength characteristics and also is sufficiently heat resistant to withstand roasting temperatures typically used for the preparation of poultry. The latter characteristic is particularly advantageous, since it enables the ultimate consumer to leave the tie formed by the machine in place during roasting with assurance that the legs of the bird will not be released.

The final tying operation of the machine is also facilitated by a sleeve 232 loosely received over the horn 202 for movement therewith. The sleeve 232 is resiliently supported for limited movement relative to the horn 202 by an annular cushion of rubber, or the like, interposed between its lower end and the strap 230. Through this provision and the proportioning of the sleeve so as to have its upper edge at a level slightly above the upper surface of the horn 202, the horn functions to clamp all four legs of the crossed thread, as exemplified in FIG. 17, between its upper surface and the lower surface of the anvil 28 when the horn 202 is raised. Thus, during the welding and cutting operation, the crossed ends of a thread are held against movement relative to each other. The resilient nature of the cushion supporting the sleeve 232, designated by numeral 234, substantially prevents the transmittal of ultrasonic vibration to the sleeve. This assures that the sleeve will not perform a cutting function on the thread engaged thereby.

Raising and lowering of the welding horn 202 and components secured thereto in timed sequence with the other operations of the machine 10 is effected through means of an electrically operated valve 236 controlled by one of the bank of cam operated switches 46. The valve 236 is connected to a primary source of air through the manifold 130 and has the conduits controlled thereby connected in fluid communication with opposite ends of the double acting pneumatic cylinder 222.

Attention is here invited to the fact that the operation of the cylinder 222, in effect, controls activation of the welding horn 202. Specifically, when the cylinder 222 is extended, an abutment 238 supported on the guide sleeve 220 is forced into triggering engagement with the limit switch 216. Triggering of the limit switch starts operation of the timer 214 which, in turn, activates the generator 210 for a predetermined time. Once the welding operation is triggered by the switch 216, however, its duration is controlled by the timer 214. From the subsequent discussion of overall machine operation, it will be seen that the duration of welder operation is less than the duration for which the cylinder 222 is extended. This characteristic results in a period after actual welding when the horn holds the crossed ends of thread against the under surface of the anvil 28.

OVERALL MACHINE OPERATION

The overall operation of the machine is fully shown in the diagrammatic illustration of FIG. 20. This figure, in effect, represents the operation of each of the six cam operated switches in the bank of switches 46. This operation is shown in terms of degrees of cam rotation. The six switches diagrammed in FIG. 20 comprise, reading from top to bottom: the switch controlling the hold-down cylinder 76; the switch controlling the needle cylinder 34; the switch controlling the transfer shuttle motor 138; the switch controlling the cross-over shuttle motor 186; the switch controlling the welder cylinder 222; and, the on-off switch which turns off the machine for reactivation by the knee operated switch 134.

From the legends on FIG. 20, the operation of each of the switch controlled devices is believed apparent. For example, it can be seen that the degree to which the cylinders 34 and 76 are extended is dependent upon the size of carcass being handled. It can also be seen that extension of the welder cylinder 222 triggers operation of the welder timer 214 and that this timer activates the welder (i.e. the ultrasonic generator 210) for a period less than that for which the cylinder 222 is extended. At the end of 360° of cam rotation, it can also be seen that all switches and components controlled thereby are returned to the position at 0° of cam rotation. Thus, the machine, after 360° of cam rotation, is in the off condition and ready to receive another carcass and manual triggering by the knee operated switch 134.

FIG. 20 also illustrates that, with the exception of placement of a carcass on the surface 16 in juxtaposed right angled relationship to the orienting plate 104 and triggering of the knee operated switch 134, all operations of the machine are automatic. This includes compensation of the hold-down and needle operating structures (i.e. those controlled by cylinders 76 and 34, respectively) to compensate for carcasses of different sizes.

From the foregoing detailed description, it is believed apparent that the present invention enables the attainment of the objects initially set forth herein. It should also be apparent that the sequential operations of the method hereinbefore summarized are carried out as follows:

(1) Passing the needles 50 and 52 through the body of the bird being handled to carry the thread in the needle 50 through the bird laterally of one of its legs and dispose the needle 52 laterally of the other of its legs;

(2) Shuttling the leading end of the thread from the needle 50 to the needle 52 through the operation of the transfer shuttle mechanism to pass the thread over the bird;

(3) Retracting the needles 50 and 52 to draw the leading end of the thread through the bird with the needle 52 and, thus, form a generally U-shaped length of thread extending over the bird and through the body thereof in encompassing relationship to its legs, with the leading and trailing ends of the thread disposed beneath the body of the bird;

(4) Pulling the leading and trailing ends of the thread together into crossed relationship beneath the bird through the operation of the cross over shuttle 164; and (5) Welding the crossed ends of the thread together through the operation of the welding horn 202 to form a closed loop of thread securing the legs of the bird against its body.

Simultaneously with the latter operation, the horn 202 functions to sever the loop of thread from the continuous source provided by the reel 162.

We claim:

1. A method for securing the legs of an eviscerated bird to the body thereof, comprising:
   (a) disposing the bird against a support;
   (b) forcing the legs of the bird against the body thereof;
   (c) passing a thread through the body of the bird laterally of one of the legs thereof so that the leading end of said thread is to one side of the bird and the trailing end is to the other side of the bird;
   (d) shuttling the leading end of said thread across the bird to a position laterally of the other of the legs thereof;
   (e) passing the leading end of the thread through the body of the bird laterally of said other leg so that the leading and trailing ends of the thread are both to said other side of the bird; and
   (f) securing the leading and trailing ends of the thread together under tension to define a loop extending around the body and legs of the bird.

2. A method of trussing an eviscerated bird, comprising:
   (a) passing a pair of needles through the body of the bird so as to dispose the legs of the bird between the needles, at least one of which needles carries an elongate length of thread therewith to direct the thread to a disposition extending through the body of the bird with the leading and trailing ends of the thread disposed to either side of the body;
   (b) shuttling the leading end of the thread from the one needle to engagement with the other to extend the thread across one side of the body;
   (c) retracting the needles to draw the thread through the body of the bird with the other needle and, thus, extend the leading end of the thread to the same side of the body as the trailing end of the thread; and
   (d) securing the leading and trailing ends of the thread together under tension to form a loop securing the legs of the bird to its body.

3. A method according to claim 2 further comprising forcing the legs of the bird against its body prior to the passing of the needles therethrough and maintaining the legs in such a condition through the step of securing together of the leading and trailing ends of the thread.

4. A method of trussing an eviscerated bird, comprising:
   (a) translating a pair of needles from one side of the body of the bird to the side opposite said one side to a position wherein legs of the bird are disposed between the needles, at least one of which needles carries an elongate length of thread therewith to direct the thread to a disposition with the trailing end thereof to said one side and the leading end thereof to said opposite side;
   (b) shuttling the leading end of the thread from the one needle to engagement with the other to extend the thread across said opposite side;
   (c) translating the needles to draw the leading end of the thread to said one side and, thus, dispose both the leading and trailing ends of the thread to said one side with the portion of the thread intermediate said ends extending across said opposite side; and
   (d) securing the leading and trailing ends of the thread together across said one side to form a loop securing the legs of the bird to its body.

5. A method according to claim 4 further comprising forcing the legs of the bird against its body prior to the translating of the needles from one side of the body of the bird to the side opposite said one side and maintaining the legs in such a condition through the step of securing together of the leading and trailing ends of the thread.

6. A method of trussing an eviscerated bird, comprising:
   (a) disposing a pair of needles to one side of the body of the bird in a position wherein the legs of the bird are disposed therebetween, at least one of which needles carries an elongate length of thread having leading and trailing ends;
   (b) shuttling the leading end of the thread from the one needle to engagement with the other to extend the thread across said one side of the body with the trailing end thereof carried by the one needle and the leading end thereof carried by the other needle;
   (c) translating the needles to dispose the leading and trailing ends of the thread to the side of the body of the bird opposite said one side while maintaining the portion of the thread intermediate said ends in a position extending across said one side; and
   (d) securing the leading and trailing ends of the thread together across said opposite side to form a loop securing the legs of the bird to its body.

7. A method of trussing an eviscerated bird, comprising:
   (a) disposing a pair of needles to one side of the body of the bird in a position wherein the legs of the bird are disposed therebetween, at least one of which needles carries an elongate length of thread having a leading end disposed to said one side and a trailing end disposed to the side of the bird opposite said one side;
(b) shuttling the leading end of the thread from the one needle to engagement with the other to extend the thread across said one side of the body;
(c) translating said other needle to direct the leading end of the thread to said opposite side and thus dispose both ends to said side with the portion of the thread between said ends extending across said one side; and
(d) securing the leading and trailing ends of the thread together across said opposite side to form a loop securing the legs of the bird to its body.

References Cited

UNITED STATES PATENTS

| | | | |
|---|---|---|---|
| 2,560,067 | 7/1951 | Bell | 17—11 |
| 2,722,712 | 11/1955 | Rabé | 17—11 |
| 3,082,475 | 3/1963 | Belknap | 17—11 |
| 3,188,212 | 6/1965 | Koonz et al. | 99—107 |
| 3,213,487 | 10/1965 | Reynolds | 17—11 |

LUCIE H. LAUDENSLAGER, Primary Examiner

U.S. Cl. X.R.

99—107